Patented Aug. 1, 1950

2,516,834

UNITED STATES PATENT OFFICE 2,516,834

PROCESS FOR THE PRODUCTION OF STEROLS FROM OILS, FATS, AND FATTY ACIDS

Otto Böhm, Lovosice, Czechoslovakia, assignor to Severoceske tukove zavody, narodni podnik, Usti nad Labem, Czechoslovakia No Drawing. Application August 2, 1947, Serial No. 765,820. In Germany July 17, 1944

Section 1, Public Law 690, August 8, 1946
Patent expires July 17, 1964

1 Claim. (Cl. 260—397.2)

For the production of sterols from oils and fats and that of cholesterol from animal fatty products and of phyrostorols from fatty substances of vegetable origin the process mostly employed hitherto was that the fatty substances were saponified and the sterols were separated from the soap liquor obtained with all the unsaponifiable portion by extraction. Since the sterol content of the fats and oils normally amounts to a maximum however of only some tenths per cent and constitutes a higher percentage at the most in exceptional cases (e. g. in tallow-oil and some animal oils), this method of production does not represent a suitable method of preparing in a technical manner these products which are valuable for therapy, pharmacology and cosmetics, because much too large quantities of starting materials would have to be subjected to this treatment in order to obtain fairly considerable quantities thereof. This working method is therefore only to be regarded as a laboratory method and was consequently employed predominantly merely for testing these substances. In order to be able to harden suitable quantities of sterols other starting materials were therefore used as the point of departure, which show a high sterol content. Cholesterol may for example be obtained from gall-stones, which contain more than 90% of this compound.

Since sterols as high molecular substances do not also pass over on the distillation of fatty acids obtainable from natural fats and oils by splitting, the fatty acid tar occurring as the residue left after distillation must contain the sterols in a greatly enriched form and could make the production thereof remunerative. The distillation of fatty acids is a process which is carried out on a large scale in the fats industry, so that rather large quantities of fatty acid tar are available. It has been established by experiments that this fatty acid tar is, however, not a suitable starting material for the production of these substances, because it already contains the sterols in a more or less changed or decomposed form. This already appears from the fact that sterols in this tar cannot be analytically determined by the usual method with digitonine even after previous splitting, because the precipitations obtained only yield an incomplete and gelatinous deposit of this double compound which is hardly filterable or very difficult to filter, in contrast to the otherwise crystalline and easily filterable form.

It has now been found that a good yield of sterols in pure form can be obtained in a simple manner from oils, fats and fatty acids if the starting substances are esterified or, as the case may be, alcoholysed with a low molecular, univalent alcohol and the fatty acid esters obtained are subjected to distillation. The resultant distillation residues contain the sterols in unchanged, non-decomposed form, so that their production is possible by the methods already known through crystallisation or precipitation.

Oils, fats, fatty acids and fatty acid mixtures of vegetable and animal origin may be considered as starting material for the production of sterols, insofar as they contain sterols in considerable quantities. The known processes of esterification or, as the case may be, alcoholysis may be employed for the manufacture of the fatty acid esters. If oils and fats, thus predominantly glycerine esters, represent the starting material for the production of the sterols, they may, for the manufacture of the fatty acid esters, either first be split and the fatty acids obtained esterified with the alcohol, or the glycerine esters may be alcoholysed direct with the alcohol. Methyl and ethyl alcohols may predominantly be considered as low molecular, univalent alcohols for the esterification or, as the case may be, the alcoholysis.

The process is especially valuable for obtaining sterols from the so-called fatty acids of refining and other fatty waste products occurring in the refining of edible fats, insofar as they contain the same. The fatty acid ester distillates produced as by-products on the isolation of the sterols may be applied to various uses.

*Example 1*

In order to produce fatty acids from rape-seed oil fatty acid of refining, which occurs on the deacidifying of rape-seed oil and still contains approximately 50% of neutral oil, it is thoroughly saponified with lye and the soap liquor is decomposed with mineral acid. 100 parts of the fatty acids so obtained are esterified with ethyl alcohol according to the process of the patent specification (Pat. App. Sch. 125,982) and the crude ethyl ester obtained is distilled in a vacuum of about 6 mm. absolute, upon which 4 parts of distillation residue (ester tar) remain behind in the distillation retort. In this ester tar are contained all the sterols originally present in the fatty acid of refining. An analytical determination showed 21.5% of unsaponifiable elements and 8.5% of sterols.

In order to isolate the sterols, the ester tar, which shows a saponification number of 137, is mixed with three times the quantity by volume of methanol and 1.1 kg of 40% caustic soda lye (approx. 10% excess of the calculated quantity), boiled for 3 hours under reflux and then so much water is added, that the proportion of methanol to water in the solution amounts to approximately 3 to 2. This aqueous-alcoholic soap liquor is now most simply extracted in a percolator with benzine (boiling limits 45-70°), to the full, the sterols dissolving with all the unsaponifiable substances. In order to remove soap residues dissolved at the same time, the benzine extract obtained is washed twice with approx. 40% methanol and finally the benzine is vaporised. By extracting the residue remaining with hot methanol the sterols are dissolved and are precipitated in crystalline form on cooling down the methanol solution. It generally proves useful, for the purpose of purification, to subject the hot methanol solution to treatment with charcoal. By recrystallisation the sterols may be obtained in a pure state.

Example 2

100 parts of sesame oil are alcoholysed with 500 parts of absolute ethyl alcohol, which contains 1% of sulphuric acid, by boiling for several hours in a reflux condenser. The excess ethyl alcohol is then distilled off for the most part from the reaction mixture and the residue obtained is washed with water. The ethyl esters of the sesame oil fatty acids obtained in this way are distilled off in a high vacuum and the distillation residue obtained is treated in the manner described in Example 1, whereupon pure phytosterols are obtained.

Example 3

Beef tallow is saponified with caustic soda lye and by decomposing the soap liquor with mineral acid the fatty acids are separated. 100 parts of the tallow oil fatty acid are esterified with methyl alcohol according to the process of patent specification No. (Germ. Pat. App. Sch. 125,982) and the methyl esters so produced are distilled in a high vacuum, the residue remaining being made into cholesterol in the customary manner.

I claim:

A process of recovering sterols from oils, fats, fatty acids and fatty mixtures specified by treating the same with a low molecular weight monohydric alcohol of the group containing methyl and ethyl alcohol, separating the greatest part of the produced esters from the esterified substance by distillation under a high vacuum, isolating the sterols from the residue by means of saponification and further esterification, separating the sterols by extraction and purifying said sterols by crystallization and recrystallization.

OTTO BÖHM.

REFERENCES CITED

The following references are of record in the file of this patent:

UNITED STATES PATENTS

| Number | Name | Date |
| --- | --- | --- |
| 2,263,550 | Andrews | Nov. 18, 1941 |
| 2,278,674 | Segessemann | Apr. 7, 1942 |
| 2,280,815 | Fernholz | Apr. 28, 1942 |
| 2,383,580 | Arrowsmith | Aug. 28, 1945 |
| 2,383,596 | Dreger | Aug. 28, 1945 |
| 2,432,181 | Trent | Dec. 9, 1947 |

OTHER REFERENCES

Ser. No. 414,980, Grandell et al. (A. P. C.), published May 11, 1943.